(12) United States Patent
Deguchi et al.

(10) Patent No.: US 8,427,776 B2
(45) Date of Patent: Apr. 23, 2013

(54) REDUCING AIR FLOW EXPOSURE TO CONDUCTIVE COMPONENTS OF A HARD DISK DRIVE

(75) Inventors: Takaaki Deguchi, Kanagawa (JP); Takashi Kouno, Ibaraki (JP); Takeshi Chawanya, Kanagawa (JP); Kenji Suzuki, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 169 days.

(21) Appl. No.: 12/980,986

(22) Filed: Dec. 29, 2010

(65) Prior Publication Data

US 2012/0170148 A1 Jul. 5, 2012

(51) Int. Cl.
*G11B 33/14* (2006.01)
*G11B 21/02* (2006.01)
*G11B 21/21* (2006.01)

(52) U.S. Cl.
USPC .............. 360/97.13; 360/266; 360/266.3

(58) Field of Classification Search ........... 360/265.9, 360/266, 266.3, 97.13, 97.19
See application file for complete search history.

(56) References Cited

U.S. PATENT DOCUMENTS

| | | | |
|---|---|---|---|
| 6,091,570 A | 7/2000 | Hendriks | |
| 6,583,959 B1 | 6/2003 | Hall | |
| 6,731,466 B2 | 5/2004 | Arya | |
| 6,751,065 B2 | 6/2004 | Smith et al. | |
| 6,804,087 B2 | 10/2004 | Wobbe et al. | |
| 7,274,537 B2 * | 9/2007 | Fan et al. | 360/265.7 |
| 7,480,120 B2 | 1/2009 | Huang | |
| 7,522,385 B2 * | 4/2009 | Soga et al. | 360/266 |
| 7,576,945 B2 | 8/2009 | Kanada et al. | |
| 7,649,717 B2 | 1/2010 | Hayakawa et al. | |
| 2006/0146443 A1 | 7/2006 | Chang et al. | |
| 2006/0158785 A1 | 7/2006 | Arya et al. | |
| 2008/0253028 A1 | 10/2008 | Chang et al. | |
| 2010/0142081 A1 * | 6/2010 | Funabashi et al. | 360/75 |
| 2011/0002066 A1 * | 1/2011 | Koganezawa et al. | 360/78.12 |

FOREIGN PATENT DOCUMENTS

| | | | |
|---|---|---|---|
| JP | 2004355721 A | * | 12/2004 |
| JP | 2005056559 A | * | 3/2005 |
| JP | 2006155771 A | * | 6/2006 |
| JP | 2009070562 A | * | 4/2009 |
| JP | 2010135002 A | * | 6/2010 |

OTHER PUBLICATIONS

Guo, Lin et al., "Disk Flutter and Its Impact on HDD Servo Performance", http://ieeexplore.ieee.org/stamp/stamp.jsp?tp=&arnumber=917633, (Mar. 2001).
He, V. et al., "Vibration Characteristics of Hard Disk Drives with Different Internal Air Pressures", http://ieeexplore.ieee.org/stamp/stamp.jsp?tp=&arnumber=4925356, (Jan. 14-16, 2009).

* cited by examiner

*Primary Examiner* — Will J Klimowicz

(57) ABSTRACT

A hard disk drive including a housing, at least one disk mounted to the housing, an actuator mounted to the housing and being movable relative to the at least one disk, a conductive component support coupled with the actuator and extending the first surface, the conductive component support having a support wall attaching the conductive component support to the actuator, and a boss coupled with a first surface of the actuator and the support wall, the boss having a first end facing a flat coil side of the actuator and a second end facing a head gimbal assembly side of the actuator, wherein the first end extends further toward the flat coil side than the conductive component entrance portion of the conductive component support such that a portion of the boss overlaps a portion of the conductive component support.

20 Claims, 6 Drawing Sheets

(Prior Art)

PROVIDE A SMOOTH PASSAGEWAY OF AIRFLOW OVER AN ARM OF AN ACTUATOR, THE AIRFLOW ORIGINATING FROM A ROTATION OF AT LEAST ONE DISK AND FLOWING OVER A SURFACE OF THE AT LEAST ONE DISK, THE SMOOTH PASSAGEWAY PROVIDED OVER A BOSS, THE BOSS COUPLED WITH A FIRST SURFACE OF THE ACTUATOR, WHEREIN THE ACTUATOR IS MOUNTED TO A HOUSING AND IS MOVABLE RELATIVE TO THE AT LEAST ONE DISK, THE ACTUATOR HAVING A SUSPENSION FOR REACHING OVER THE AT LEAST ONE DISK, THE SUSPENSION HAVING A HEAD GIMBAL ASSEMBLY THEREON,

WHEREIN THE ACTUATOR COMPRISES THE FIRST SURFACE AND A SECOND SURFACE OPPOSITE THE FIRST SURFACE, AND IS COUPLED WITH A CONDUCTIVE WIRE SUPPORT THAT EXTENDS THE FIRST SURFACE, THE CONDUCTIVE WIRE SUPPORT THAT COMPRISES A SUPPORT WALL THAT ATTACHES THE CONDUCTIVE WIRE SUPPORT TO THE ACTUATOR, THE SUPPORT WALL EXTENDING ABOVE THE FIRST SURFACE, THE CONDUCTIVE WIRE SUPPORT CONFIGURED FOR SUPPORTING AT LEAST ONE CONDUCTIVE WIRE THEREON, THE CONDUCTIVE WIRE SUPPORT HAVING A CONDUCTIVE WIRE ENTRANCE PORTION POSITIONED BETWEEN A FLAT COIL OF THE ACTUATOR AND THE HEAD GIMBAL ASSEMBLY, AND

WHEREIN THE BOSS COMPRISES A FIRST END FACING A FLAT COIL SIDE OF THE ACTUATOR AND A SECOND END FACING A HEAD GIMBAL ASSEMBLY SIDE OF THE ACTUATOR, WHEREIN THE FIRST END IS PROVIDED FURTHER TOWARD THE FLAT COIL SIDE THAN THE CONDUCTIVE WIRE ENTRANCE PORTION SUCH THAT A PORTION OF THE BOSS OVERLAPS A PORTION OF THE CONDUCTIVE WIRE SUPPORT

REDUCING AIR FLOW EXPOSURE TO CONDUCTIVE COMPONENTS OF A HARD DISK DRIVE

FIELD

Embodiments of the present technology relates generally to the field of computing.

BACKGROUND

At least one hard disk drive (HDD) is used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

The basic HDD model includes a storage disk or hard disk that spins at a designed rotational speed. An actuator arm with a suspended slider is utilized to reach out over the disk. The slider is coupled with a suspension that supports both the body of the slider and a head assembly that has a magnetic read/write transducer or head or heads for reading/writing information to or from a location on the disk. The complete head assembly, e.g., the suspension, slider, and head, is called a head gimbal assembly (HGA).

In operation, the hard disk is rotated at a set speed via a spindle motor assembly having a central drive hub. There are tracks at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk as a string of bits.

A rotation of hard disk generates airflow over the surface of the hard disk. Frequently, this airflow ultimately leads to vibration of portions of the head gimbal assembly.

BRIEF DESCRIPTION OF THE DRAWINGS

FIG. 6 illustrates a flow chart of an example method of airflow exposure to at least one conductive component of a hard disk drive, in accordance with an embodiment of the present technology.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Overview of Discussion

Embodiments in accordance with the present technology pertain to an apparatus for reducing airflow exposure to at least one conductive component of a hard disk drive system. In one embodiment in accordance with the present technology, the apparatus described herein enables the airflow originating from the rotation of the magnetic disk to smoothly flow over the actuator arm and the attached conductive wiring without causing the conductive components to vibrate. By avoiding vibration of the conductive components, the apparatus enables the head gimbal assembly to experience reduced vibrations, thus improving tracking accuracy.

The discussion below will begin with an overview of a hard disk drive and components connected therewith. The discussion will then focus on embodiments of the apparatus.

Hard Disk Drive

Figure 1:
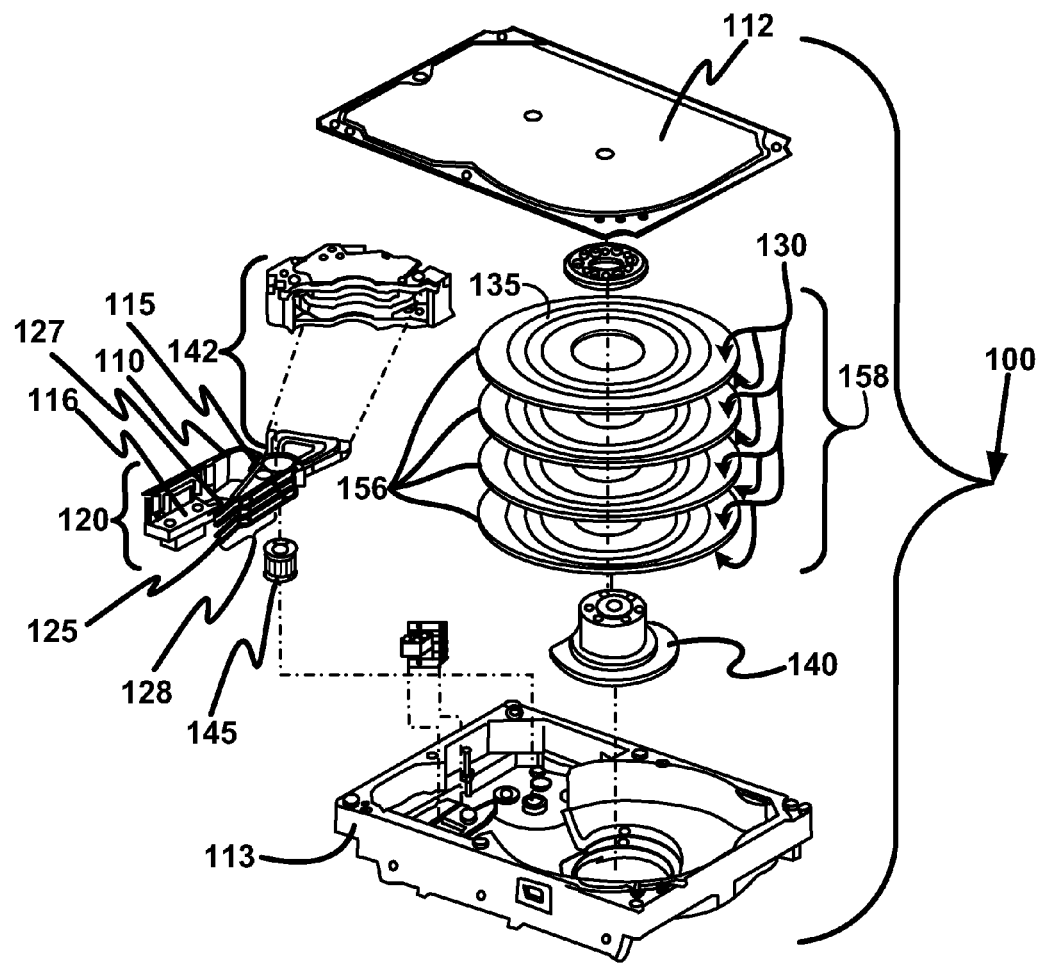
FIG. 1 is an isometric blow-apart of an HDD, in accordance with an embodiment of the present technology.

With reference to FIG. 1, an isometric blow-apart of HDD 100 is shown in accordance with an embodiment of the present invention. Base casting 113 provides coupling points for components and subassemblies such as disk stack 158, voice coil motor (VCM) 142, and HSA 120. Disk stack 158 is coupled with base casting 113 by means of motor-hub assembly 140. Motor-hub assembly 140 will have at least one disk 156 coupled with it such that disk 156 can rotate about an axis common to motor-hub assembly 140 and the center of disk 156. Disk 156 has at least one disk surface 130 upon which reside data track 135. HSA 120, referred to as an actuator when coupled with pivot bearing 145, comprises suspension 127, which suspends hard disk drive slider 125 next to disk surface 130, and connector 116, which conveys data between A/E module 115 and a host system wherein HDD 100 resides. Suspension 127 and hard disk drive slider 125 comprise head gimbal assembly (HGA) 128. Flex cable 110, which is part of HSA 120, conveys data between connector 116 and HSA 120.

HSA 120 is coupled pivotally with base casting 113 by means of pivot bearing 145, such that VCM 142 can move HGA 128 with slider 125 arcuately across disk surface 130. Upon assembly of HSA 120, disk stack 158, VCM 142, and other components with base casting 113, cover 112 is coupled with base casting 113 (the cover 112 and the base casting 113 may be referred to as a housing) to enclose these components and subassemblies into HDD 100.

Example Apparatus

Embodiments of the present technology provide a hard disk drive that makes it possible to reduce the vibration of conductive components and the head gimbal assembly which is linked to these conductive components. In order to reduce the vibration of the conductive components, an embodiment of the present technology provides a boss whose end on the flat coil side of the actuator is extended further toward the flat coil side than the conductive component entrance portion of the conductive component support. Further, the end of the boss on the head gimbal assembly side extends further toward the head gimbal assembly than the conductive component entrance portion.

Thus, when the air from the spoiler flows from the arm to the boss, the direction of the advance of the air is largely unchanged. The air flows over the conductive components without being diverted. Since the air is not diverted, the air passes smoothly over the conductive components, thus reducing the opportunities for the flow of air to hit the conductive components and cause vibrations.

It should be appreciated that the term, "conductive component", refers to any conductive means coupled with the hard disk drive, in embodiments of the present technology. For example, but not limited to, the conductive component may be a conductive wire, patterned circuit plate (sheet), etc.

Figure 2:
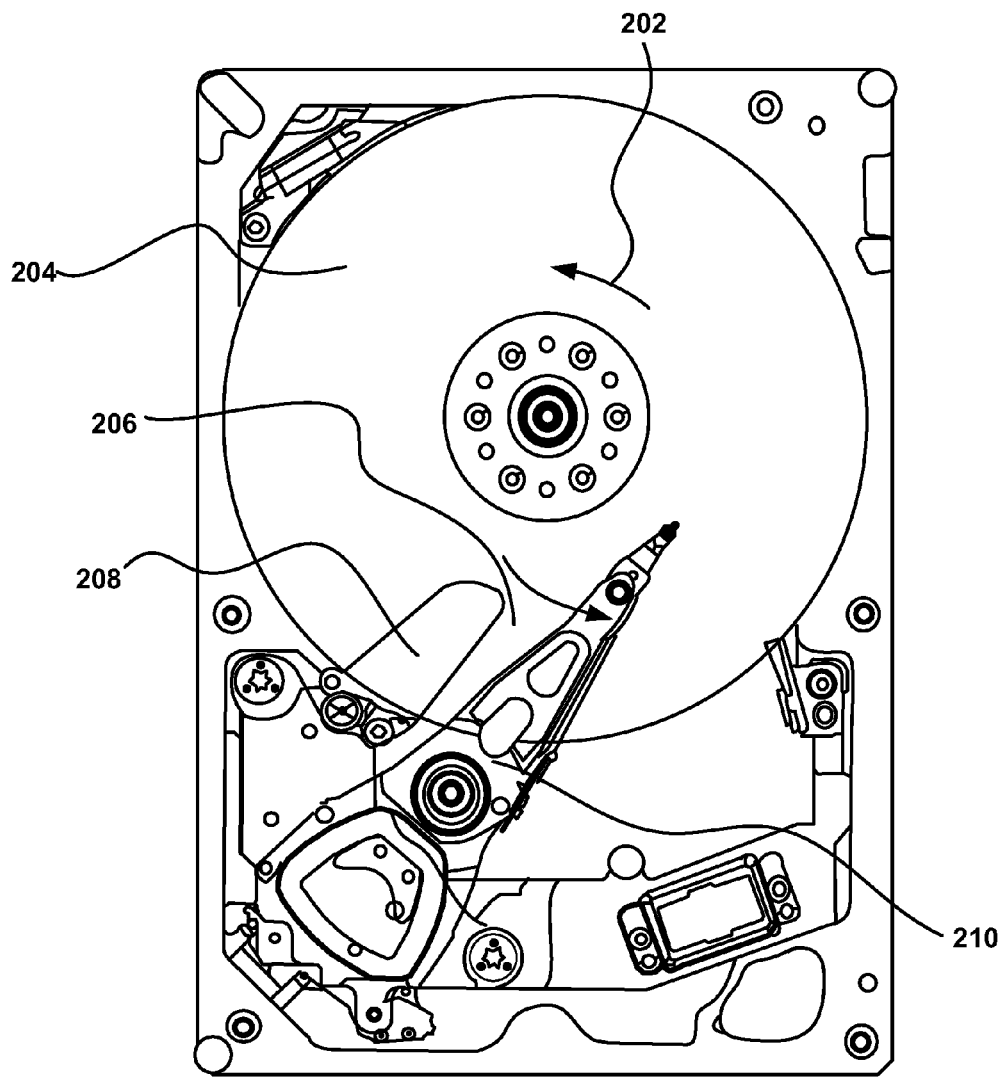
FIG. 2 is an illustration of an example HDD, in accordance with an embodiment of the present technology.

FIG. 2 is an illustration of an example HDD, in accordance with embodiments of the present technology. FIG. 2 shows the magnetic disk 204 (referred to elsewhere herein as a hard disk) rotating in a direction of the arrow 202. This rotation generates a flow of air 206 over the surface of the magnetic disk 204. In particular, the air from the spoiler 208 passes the arm (see FIG. 4B), which is the metal section of the actuator 210.

Figure 3:
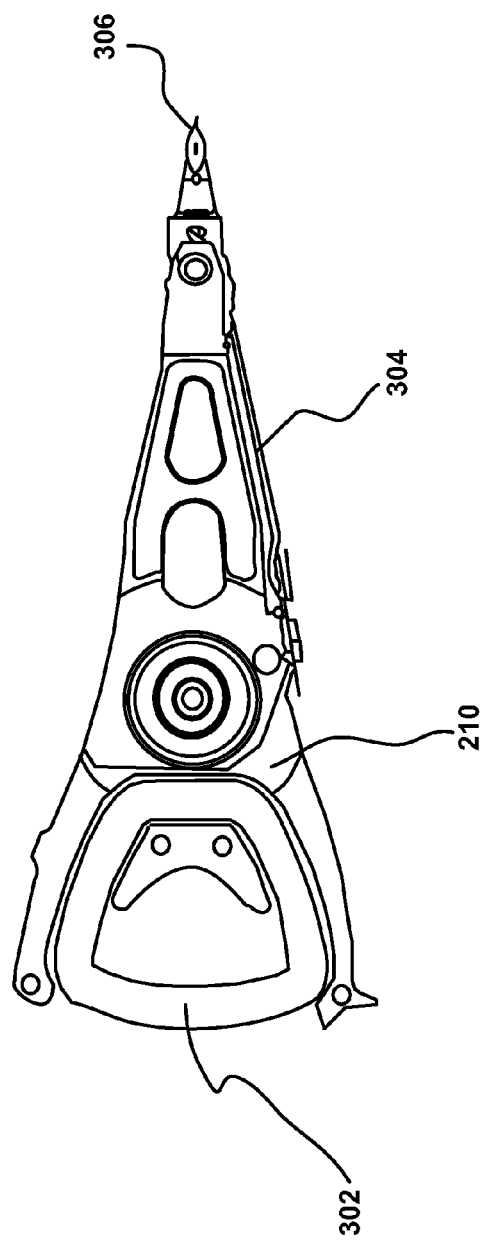
FIG. 3 is an illustration of an example actuator, in accordance with an embodiment of the present technology.

FIG. 3 is an illustration of an example actuator 210, in accordance with embodiments of the present technology. The actuator in FIG. 3 shows a flat coil 302, conductive components 304 and a head gimbal assembly 306.

Figure 4A:
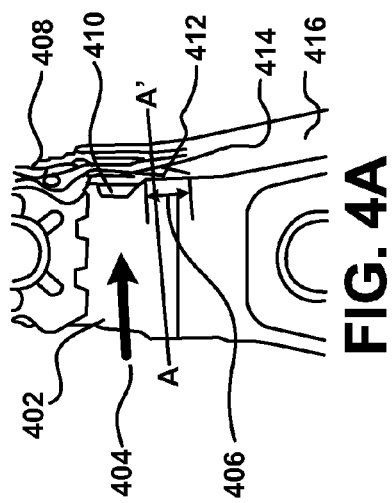
FIG. 4A is an illustration of a conventional actuator.
Figure 4B:
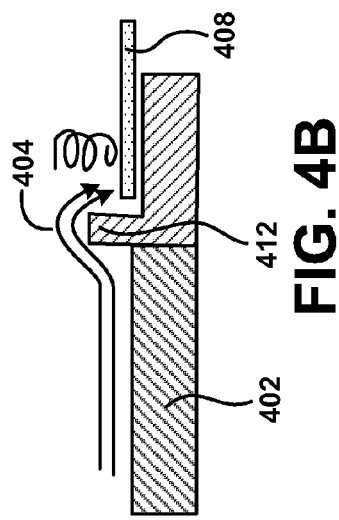
FIG. 4B is an illustration of a portion of a conventional actuator, the cross section along A-A' of FIG. 4A, illustrating the direction of the airflow over the arm of the actuator.

FIGS. 4A and 4B are illustrations of a conventional actuator. More particular, it can be shown through FIG. 4A that when the airflow 404 from the spoiler passes the arm 402, it strikes the support wall 412 of the conductive component support 416. It is diverted at the portion where a constant gap 406 is provided. The diverted air drops down onto the conductive component(s) 408. Fluctuations in air pressure in the region of the conductive component(s) 408 increase, thereby producing a very turbulent flow of air. This turbulent flow of air causes the conductive component(s) 408 to vibrate, which also leads to vibration of the head of the head gimbal assembly (which is linked to the conductive component(s) 408). As shown, FIG. 4A also includes a boss 410 and shows a conductive component entrance portion 414. FIG. 4B shows the cross section along A-A' of FIG. 4A.

Figure 5A:
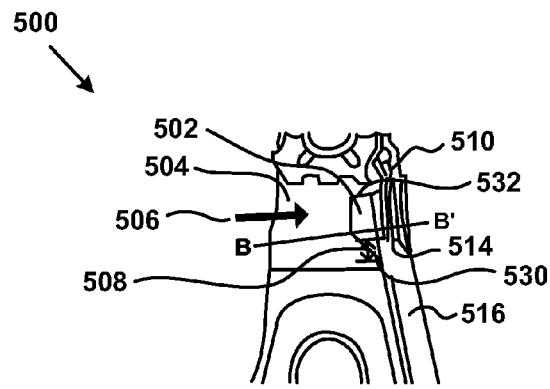
FIG. 5A is an illustration of an example actuator, in accordance with an embodiment of the present technology.
Figure 5B:
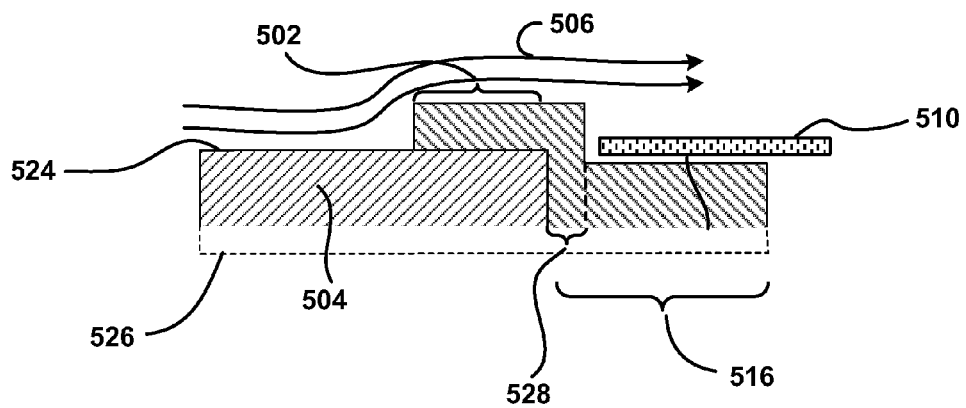
FIG. 5B is an illustration of an example actuator, the cross section along B-B' of FIG. 5A, illustrating the direction of the airflow over the arm of the actuator, in accordance with an embodiment of the present technology.

FIGS. 5A and 5B are illustrations of an actuator, in accordance with an embodiment of the present technology. An embodiment of the present technology enables the reduction of vibration of the conductive components and the head gimbal assembly which is linked to the conductive components. FIG. 5B represents the cross section along B-B' of FIG. 5A.

In reference now to FIGS. 1, 2, 3, 5A and 5B, one embodiment includes a housing, at least one disk of a disk stack 158 mounted to the housing, an actuator 500 mounted to the housing, a conductive component support 516 coupled with the actuator 500 and a boss 502 coupled with the first surface 524 of the actuator 500 and a support wall 528 of the conductive component support 516. For purposes of brevity and clarity, the at least one disk will be referred to as disk hereinafter, unless specifically noted otherwise.

In one embodiment the actuator 500 is movable relative to the disk. The actuator 500 also comprises a first surface 524 and a second surface 526 opposite the first surface 524. The actuator 500 has a suspension for reaching over the disk. The suspension has a head gimbal assembly 306 thereon.

In one embodiment, the conductive component support 516 is coupled with the actuator 500 and extends the first surface 524. This extension is along the plane formed by the first surface 524 of the actuator 500. The conductive component support 516 has a support wall 528 attaching the conductive component support 516 to the actuator 500. The conductive component support 516 supports at least one conductive component 510 thereon. It is appreciated that more than one conductive component 510 may be supported on the conductive component support 516. The conductive component support 516 has a conductive component entrance portion 514 positioned between a flat coil 302 of the actuator 500 and a head gimbal assembly 306 of the actuator 500.

In one embodiment, the support wall 528 extends above the first surface 524 of the actuator 500.

In one embodiment, the boss 502 is coupled with the first surface 524 of the actuator 500 and the support wall 528. The boss 502 has a first end 530 facing a flat coil 302 side of the actuator 500 and a second end 532 facing a head gimbal assembly 306 side of the actuator 500, wherein the first end 530 is provided further toward the flat coil 302 side than the conductive component entrance portion 514 such that a portion of the boss 502 overlaps 508 a portion of the conductive component support 516.

In one embodiment, the second end 532 of the boss 502 extends further toward the head gimbal assembly 306 side than the conductive component entrance portion 514. In another embodiment, the boss 502 extends above the first surface 524 at a same height as the support wall 528. In one embodiment, the boss 502 extends above the first surface 524 of the actuator 500 at a height greater than a height at which the support wall 528 extends above the first surface 524. In one embodiment, the boss 502 extends above the first surface 524 of the actuator 500 at a height that is less than a height at which the support wall 528 extends above the first surface 524.

In one embodiment, the first end 530 of the boss 502 comprises a squared-off shape. In another embodiment, the first end 530 of the boss 502 comprises an inclined shape.

Example Method for Reducing Air Flow Exposure to Conductive Component(s) of a Hard Disk Drive FIG. 6 illustrates a flow chart 600 of an example method for reducing air flow exposure to conductive component(s) 510 of a hard disk drive, in accordance with embodiments of the present technology.

Referring to 602 of FIG. 6 and FIGS. 1, 2, 3, 5A and 5B and as described herein, in one embodiment, a smooth passageway of airflow 506 is provided over an arm 504 of an actuator 500, the airflow 506 originating from a rotation of at least one disk 202 and flowing over a surface of the at least one disk 204. The smooth passageway is provided over a boss 502.

The boss 502 is coupled with a first surface 524 of the actuator 500, wherein the actuator 500 is mounted to a housing and is movable relative to the 204. The actuator 500 has a suspension for reaching over the disk 204. The suspension has a head gimbal assembly 306 thereon.

The actuator 500 comprises the first surface 524 and a second surface 526 opposite the first surface 524, and is coupled with a conductive component support 516 that extends the first surface 524. The conductive component support 516 includes a support wall 528 that attaches the conductive component support 516 to the actuator 500. The support wall 528 extends above the plane of the first surface 524. The conductive component support 516 is configured for supporting at least one conductive component 510 thereon.

The conductive component support 516 has a conductive component entrance portion 514 positioned between a flat coil 302 of the actuator 500 and the head gimbal assembly 306.

In one embodiment, the boss 502 includes a first end 530 facing a flat coil 302 side of the actuator 500 and a second end 532 facing a head gimbal assembly 306 side of the actuator 500. The first end 530 is provided further toward the flat coil 302 side than the conductive component entrance portion 514 such that a portion of the boss 502 overlaps 508 a portion of the conductive component support 516.

Thus, embodiments of the present technology enable the reduction of vibrations occurring among the conductive support wires, thereby increasing tracking accuracy.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A hard disk drive comprising:
   a housing;
   at least one disk mounted to said housing;
   an actuator mounted to said housing and being movable relative to said at least one disk, said actuator having a suspension for reaching over said at least one disk, said suspension having a head gimbal assembly thereon, said actuator comprising a first surface and a second surface opposite said first surface;
   a conductive component support coupled with said actuator and extending said first surface, said conductive component support having a support wall attaching said conductive component support to said actuator, said support wall extending above said first surface, said conductive component support configured for supporting at least one conductive component thereon, said conductive component support having a conductive component entrance portion positioned between a flat coil of said actuator and said head gimbal assembly of said actuator;
   a boss coupled with a first surface of said actuator and said support wall, said boss having a first end facing a flat coil side of said actuator and a second end facing a head gimbal assembly side of said actuator, wherein said first end extends further toward said flat coil side than said conductive component entrance portion such that a portion of said boss overlaps a portion of said conductive component support.

2. The hard disk drive of claim 1, wherein said second end extends further toward said head gimbal assembly side than said conductive component entrance portion.

3. The hard disk drive of claim 1, wherein said boss extends above said first surface at a same height as said support wall.

4. The hard disk drive of claim 1, wherein said boss extends above said first surface at a height greater than a height at which said support wall extends above said first surface.

5. The hard disk drive of claim 1, wherein said boss extends above said first surface at a height that is less than a height at which said support wall extends above said first surface.

6. The hard disk drive of claim 1, wherein said first end of said boss comprises a squared-off shape.

7. The hard disk drive of claim 1, wherein said first end of said boss comprises an inclined shape.

8. An actuator of a hard disk drive, said actuator mounted to a housing and being movable relative to at least one disk, said actuator having a suspension for reaching over said at least one disk, said suspension having a head gimbal assembly thereon, said actuator comprising:
   a first surface and a second surface opposite said first surface,
   a conductive component support coupled with said actuator and extending said first surface, said conductive component support having a support wall attaching said conductive component support to said actuator, said support wall extending above a portion of said first surface, said conductive component support configured for supporting at least one conductive component thereon, said conductive component support having a conductive component entrance portion positioned between a flat coil of said actuator and a head of said actuator;
   a boss coupled with said first surface and said support wall, said boss having a first end facing a flat coil side of said actuator and a second end facing a head gimbal assembly side of said actuator, wherein said first end extends further toward said flat coil side than said conductive component entrance portion such that a portion of said boss overlaps a portion of said conductive component support.

9. The actuator of claim 8, wherein said second end extends further toward said head gimbal assembly side than said conductive component entrance portion.

10. The actuator drive of claim 8, wherein said boss extends above said first surface at a same height as said support wall.

11. The actuator drive of claim 8, wherein said boss extends above said first surface at a height greater than a height at which said support wall extends above said first surface.

12. The actuator drive of claim 8, wherein said boss extends above said first surface at a height that is less than a height at which said support wall extends above said first surface.

13. The actuator drive of claim 8, wherein said first end of said boss comprises a squared-off shape.

14. The actuator of claim 8, wherein said first end of said boss comprises an inclined shape.

15. A method for reducing air flow exposure to conductive components of a hard disk drive, said method comprising:
   providing a smooth passageway of airflow over an arm of an actuator, said airflow originating from a rotation of at least one disk and flowing over a surface of said at least one disk, said smooth passageway provided over a boss, said boss coupled with a first surface of said actuator, wherein said actuator is mounted to a housing and is movable relative to said at least one disk, said actuator having a suspension for reaching over said at least one disk, said suspension having a head gimbal assembly thereon,
   wherein said actuator comprises said first surface and a second surface opposite said first surface, and is coupled with a conductive component support that extends said first surface, said conductive component support comprises a support wall that attaches said conductive component support to said actuator, said support wall extending above said first surface, said conductive component support configured for supporting at least one conductive component thereon, said conductive component support having a conductive component entrance portion positioned between a flat coil of said actuator and said head gimbal assembly, and
   wherein said boss comprises a first end facing a flat coil side of said actuator and a second end facing a head gimbal assembly side of said actuator, wherein said first end extends further toward said flat coil side than said conductive component entrance portion such that a portion of said boss overlaps a portion of said conductive component support.

16. The method of claim 15, further comprising:
providing said second end that extends further toward said head gimbal assembly side than said conductive component entrance portion.

17. The method of claim 15, further comprising:
providing said boss that extends above said first surface at a same height as said support wall.

18. The method of claim 15, further comprising:
providing said boss that extends above said first surface at a height greater than a height at which said support wall extends above said first surface.

19. The method of claim 15, further comprising:
providing said first end that is of a squared-off shape.

20. The method of claim 15, further comprising:
providing said first end that is of an inclined shape.

* * * * *